United States Patent Office 2,945,015
Patented July 12, 1960

2,945,015
CATALYST AND PROCESS FOR PRODUCING OLEFIN POLYMERS

Clyde V. Detter, Bartlesville, Okla., assignor to Phillips Petroleum Company, a corporation of Delaware No Drawing. Filed Dec. 16, 1955, Ser. No. 553,436

10 Claims. (Cl. 260—88.2)

This invention relates to improved processes for producing polymers of olefins. In another aspect it relates to novel catalyst to promote the polymerization of olefins.

It has recently been discovered that polymers, which include novel tacky polymeric products and/or solid polymers, can be obtained by polymerizing aliphatic olefins in the presence of a catalyst comprising chromium oxide associated with at least one member selected from the group consisting of silica, alumina, thoria and zirconia. Solid polymers can similarly be produced from diolefins. Chromium oxide, which includes at least a portion of the chromium in the hexavalent form, is an essential catalytic ingredient for the production of such high molecular weight polymers by low pressure polymerization. In accordance with the present invention it has been discovered that such polymerization reactions can be carried out more efficiently by the addition of an oxide of phosphorus to the catalyst.

Accordingly, it is an object of this invention to provide a process for polymerizing olefins in the presence of a novel catalyst.

Another object is to provide an improved catalyst to promote the polymerization of olefins.

A further object is to provide an improved method of forming olefin polymerization catalysts.

Other objects, advantages and features should become apparent from the following detailed description of present preferred embodiments of the invention.

The catalyst employed in the polymerization processes of this invention comprises chromium oxide and an oxide of phosphorus deposited on a material selected from the group consisting of at least one of silica, alumina, thoria and zirconia. This catalyst is highly actvie in polymerizing certain olefins to produce heavy polymers. Its capacity to polymerize olefins to provide maximum yields of tacky and solid polymers appears to be greatest in connection with 1-olefins of maximum chain length of 8 carbon atoms and havnig no branching nearer the double bond than the 4-position. It does polymerize other olefins, but the polymers are predominantly normally liquid. Diolefins, for example, butadiene and isoprene, can be polymerized to solid polymers when using the catalyst of this invention. In the case of conjugated diolefins, a methyl group can be closer to a double bond than the 4-position. The diolefin must have at least one terminal double bond. Conjugated diolefins can have small substituents, for example, methyl, ethyl and chlorine radicals, as close as the 3-position to the terminal double bond. Non-conjugated diolefins exhibit the same characteristics as monoolefins in the processes of this invention. The polymers produced in accordance with this invention are characterized by the fact that the unsaturation thereof is predominantly of the trans-itnernal or terminal vinyl type.

Throughout this specification, it is to be understood that the total polymer designates all polymer boiling above the monmer (but not including any diluent, of course); the semi-solid polymer constitutes the mixture or residuum remainng after distilling off, or otherwise removing, the light oil boiling below about 900° F.; the tacky polymer is the lower molecular weight portion of the semisolid polymer, which portion can be extracted thereform with n-pentane at room temperature; and the solid polymer is the higher molecular weight portion of the semisolid fraction, which constitutes the raffinate or insoluble portion left from the extraction with n-pentane or methylisobutylketone. Ethylene polymers produced according to this invention are composed preponderantly of normally solid material; only small amounts of tacky or liquid polymer are ordinarily produced from ethylene.

The catalyst employed in carrying out the polymerization processes of this invention comprises chromium oxide and an oxide of phosphorus associated with at least one additional oxide which can be a support material. A preferred support is a silica-alumina composite containing a major proportoin of silica and a minor proportion of alumina. While the method of preparing the silica-alumina composite undoubtedly affects the catalyst activity to some extent, it appears that silica-alumina composites prepared by any of the prior art processes for preparing such catalytically active composites are operative for the process of this invention. Coprecipitation and impregnation are examples of such processes. One support that has been found particularly effective is a coprecipitated 90 percent silica-10 percent alumina support. It is found that steam treatment of this support, i.e., silica-alumina, or silica without appreciable alumina, improves the actvity and life of the catalyst composite in a polymerization reaction. The preferred steam activation of the silica-alumina base of the catalyst is conducted at a temperature of approximately 1200° F. for 10 hours utilizing 5 volume percent steam admixed with 95 volume percent air. In the steam activation treatment, the temperature can be varied from 1100 to 1300° F. and the steam content of the steam-air mixture can range from about 3 to about 10 percent. The time of treatment can vary from about 4 to about 15 hours. A silica support of lower surface area and larger pore size is a better support than one having extremely high surface area and small pore size. These factors are believed to be of importance in the removal of the heavy polymer from the surface of the catalyst composite.

It is necessary for some of the chromium to be in the hexavalent state to act as an active promoter for the polymerization reaction of this invention. It is preferred to use catalyst in which the amount of hexavalent chromium is at least 0.1 percent of the weight of the catalyst composite, as determined by ascertaining the water-soluble chromium present by leaching with water and measuring the dissolved chromium in the leachings. The chromium content of the catalyst can vary from 0.1 to 10 weight percent, although larger amounts may sometimes be employed. The chromium content preferably is in the range of 1 to 6 weight percent. The phosphorus content is generally in the range of 0.1 to 4 atoms of phosphorus per atom of chromium, and is preferably in the range of 1 to 5 weight percent. This catalyst can be produced in a number of ways. The presently preferred method comprises impregnating a coprecipitated silica-alumina base with an aqueous solution of chromium trioxide and phosphoric acid. Other methods include impregnating with the ammonium or hydrazine salt of acids of phosphorus and chromium, as well as with the acids themselves, or with other compounds which yield oxides of phosphorus under the conditions of treating. The acids of phosphorus are hydrated oxides of phosphorus. Aqueous solutions are normally used in the impregnating step. The composite is then dried and activated by heating to a temperature in the range of 700 to 1500° F. preferably in the range of 900 to 1100° F. This heating can be carried out in the presence of inert gases such as nitrogen, but it is preferred that an oxidizing atmosphere be maintained as, for example, air or oxygen. At least one hour of heating is desired. In general, it has been found that heating beyond five hours does not result in the catalyst being activated to any greater extent.

The chromium and phosphorus solutions can be added to the support either simultaneously or one following the other. If the phosphorus solution is added last, it is important that the amount of phosphorus be limited so as not to cover completely the chromium on the support. If this particular order of addition is followed, the ratio by weight of phosphorus to chromium should not be greater than about 1 to 2. Any possibility of the phosphorus masking the catalytic effect of the chromium is minimized if the two solutions are added to the support simultaneously, and this is the preferred method.

The terms "support" or "base," as used herein, are not to be narrowly interpreted. They are not limited to mere inert components of the catalyst mass. The non-chromium, non-phosphorus components appear to impart to the catalyst at least part of its activity, and variations in their identity and proportions affect the catalyst activity. The "support" is preferably utilized in porous form, for example, a gel.

The temperature to be employed in carrying out the polymerization reactions of this invention can vary over a broad range, but normally is from about 150 to 450° F. The preferred range for propylene and higher olefins is 150 to 250° F., and that for ethylene is 275 to 375° F. when a fixed bed of catalyst is utilized. When a mobile catalyst is employed, the optimum polymerization temperature range is 200 to 350° F. for ethylene. At temperatures lower than those in the preferred ranges, the rate of catalyst deactivation increases and catalyst-bed plugging may occur, and at temperatures higher than those in the preferred ranges, the rate of catalyst deactivation increases and polymer molecular weight decreases.

The pressure is preferably high enough to maintain the diluent in the liquid phase and to assure that olefins not liquefied under these conditions are dissolved in the liquid phase in sufficient amount. This often, but not invariably, requires a pressure of at least 100 to 300 p.s.i., depending on the feed and the temperature, and a pressure of approximately 500 p.s.i. is to be preferred. The pressure can be as high as 700 p.s.i. or higher, if desired. It can be as low as atmospheric when, for example, the reaction is conducted in the gaseous phase. As a general rule, high pressures favor the production of high molecular weight polymers, all other conditions being constant. The feed rate can range from 0.1 to 20 liquid hourly space velocity with a preferred range of 1 to 6 liquid hourly space velocity in a liquid-phase process with fixed-bed catalyst. Hydrocarbon diluents, preferably paraffins and/or cycloparaffins, serve as solvents for the polymer products to aid in the removal of the product from the catalyst in the reactor. These diluents include aliphatic paraffins having from 3 to 12, preferably 5 to 12, carbon atoms per molecule. Any of the paraffins which is a solvent for the heavy polymer at temperatures in the operating range is suitable. Any hydrocarbon diluent which is relatively inert, non-deleterious and liquid under the reaction conditions of the process can be utilized.

Diluents which may be employed include propane, isobutane, normal pentane, isopentane, isooctane (2,2,4-trimethylpentane), cyclohexane and methylcyclohexane. The heavier paraffinic diluents give better results than the lighter ones, probably because they are better solvents for the heavy polymer. Aromatic diluents are, in general, not used, since they appear to decrease the activity of the catalyst. They are, however, operative.

The polymerization can be effected with a fixed-bed catalyst or with a mobile catalyst. A presently preferred method of conducting the polymerization reaction comprises contacting the feed olefin with a slurry of comminuted chromium oxide-phosphorus oxide catalyst in suspension in the solvent or diluent. The catalyst can be maintained in suspension by a mechanical agitation device and/or by virtue of the velocity of the incoming feed or diluent. It is desired that there be maintained a gaseous phase of the olefin being polymerized in contact with the olefin-diluent mixture. The olefin is introduced into the reaction zone at a rate at least as great as the rate it is being polymerized. Preferably, the olefin is supplied to the reaction zone at a rate greater than at which it is polymerized. A stirred reactor can be employed to advantage wherein the excess olefin maintains a gas cap over the liquid mixture. The vortex produced by the stirrer draws the gas down into the liquid. In this type of operation, a large portion of the product polymer remains associated with the catalyst, which is withdrawn from the reaction zone, as a slurry. The polymer is recovered by dissolution in a solvent of the type described, usually with the aid of heat and agitation, and the stripped catalyst may be recycled and/or regenerated. The regeneration is accomplished by oxidizing the residual carbonaceous deposit with a controlled concentration of oxygen in an inert gas by conventional procedures.

One of the problems encountered in fixed-bed operation of the polymerization process of the invention lies in the plugging of the catalyst bed with heavy polymer. Periodically reversing the direction of flow of feed through the catalyst bed aids in distributing the heavy polymer over the catalyst and extends the time the catalyst can be utilized before regeneration is required. Effecting the process by countercurrently contacting a slowly gravitating bed of the catalyst with the liquid feed makes it possible to utilize the catalyst over longer periods of time before regeneration is necessary and prevents plugging of the catalyst bed, which eventually occurs in a fixed-bed operation. The olefin-containing feed, together with a hydrocarbon solvent, such as n-pentane or isooctane, under sufficient pressure to maintain liquid phase, is charged into the bottom of the reactor and moved upwardly at a linear velocity which can be sufficient to give some expansion of the bed to prevent plugging by high polymer accumulation, but insufficient to cause substantial top-to-bottom mixing of the catalyst. In this type of operation, it is possible to maintain a top bed temperature in the range of 100 to 150° F. and a bottom bed temperature in the same range, while the temperature of the middle section of the bed is maintained in the range of about 200 to 250° F. in propylene or higher 1-olefin polymerization. This type of operation and temperature control effects the production of a larger proportion of high molecular weight polymer in both the top and bottom sections of the bed and increases the yield of tacky and solid polymer. Temperature is controlled by regulating the temperature of the feed and the temperature of the incoming catalyst. The feed cools the hotter catalyst coming from the middle or intermediate section of the bed, and the cooler catalyst admitted to the top section of the bed cools the liquid passing into the top section of the bed from the hotter intermediate section.

In this moving-bed process, the liquid feed rate is maintained in the range of 2 to 6 v./v./hr.; the olefin concentration, in the hydrocarbon feed, in the range of 0.1 to 25 weight percent; and the catalyst rate in the range of 0.1 to 0.5 v./v./hr. In this process, fresh olefin-containing feed contacts the less active catalyst at a minimum temperature so that excessive reaction is avoided and heavier polymer is produced. The upflowing feed is heated by direct heat exchange with hot catalyst from the higher temperature region produced by heat of reaction, and the temperature reaches a maximum at or near the middle of the bed. As the feed moves on up through the top part of the bed, it becomes more depleted in olefins and is cooled by direct heat exchange with cooler fresh catalyst. In the top part of the bed, the fresh, highly active catalyst contacts the olefin-depleted feed at or near the minimum temperature of the range so that excessive reaction is avoided and heavier polymer is produced. The effluent from the top of the reactor contains the total polymer (except polymer deposited on the catalyst), together with the hydrocarbon solvent, such as pentane or isooctane. Polymer remaining on the catalyst can be recovered, at least in part, by treatment of the catalyst with a suitable solvent, such as those previously described herein, at a temperature above reaction temperature, or by stripping the catalyst with an inert gas at a still higher temperature, for example, 700 to as high as 1100° F. or higher, the effluent stripping gas being cooled to condense polymer removed therein. The polymer can be recovered from solution in the solvent by evaporation of the solvent. Operation with the temperature gradients indicated results in considerable reaction at lower temperatures than would otherwise be possible, and ultimately results in the production of heavier polymer. In addition, excessive reaction in a narrow zone with plugging difficulties and catalyst disintegration are avoided.

Used catalyst can be regenerated in auxiliary equipment in the usual manner. The catalyst is first washed with a hydrocarbon solvent, such as pentane or isooctane, at a temperature in the range of 300 to 400° F., and under sufficient pressure to maintain the solvent in the liquid phase. Any remaining solid polymer is then removed from the catalyst by dry air diluted with inert gas. The temperature at which the solid polymer is burned off the catalyst is maintained preferably in the range of 900 to 1100° F. Solid polymer is recovered from the solvent used in the washing step, and the polymer-free solvent is reusable in subsequent washings.

Further, according to this invention, special benefits can be obtained by utilizing, as feed to the process, a mixture of at least two different olefins. For example, ethylene and propylene can be copolymerized, as can ethylene and 1-butene, 1-butene and propylene, or propylene and a pentene, in the presence of a chromium oxide-phosphorus polymerization catalyst. By using a propylene-ethylene mixture containing from 10 to 45 weight percent propylene as a feed component, a copolymer can be obtained which has increased flexibility and is readily capable of being extruded to form a film. Films of this type are unusually resistant to moisture-vapor penetration and are useful as wrappings for foods, drugs, chemicals, and the like. By using, as a feed ingredient, a propylene-ethylene mixture containing from 0.5 to 10 weight percent propylene, spalling or disintegration of the catalyst particles is decreased. A similar effect is obtained by the use of a propylene-ethylene mixture containing from about 1 to about 20 weight percent ethylene. The preferred temperature range for ethylene-propylene copolymerization is from 240 to 320° F., preferably 250 to 280° F.

Many of the copolymers of this invention have a flexibility rating, as determined by the falling ball method, of at least 72 inches. This rating is determined by allowing a 90-gram steel ball to fall from a measured height and strike a molded disc of the copolymer two inches in diameter and one-eighth inch thick. The ball falls along a mechanical guide, and the height from which the ball drops is measured. The minimum height required to shatter the molded disc is taken as a rating of flexibility or susceptibility to shattering. The maximum height measurable according to this method and apparatus is 72 inches. Thus, many of the copolymers of this invention are not shattered by the falling ball within the limits of measurement of the method. In contrast, so-called brittle polymers can be shattered by the ball when it falls from a much smaller height, such as no more than 6 to 10 inches.

The polymer and copolymer films prepared according to this invention have a moisture penetration rating not greater than 1 gram per mil thickness per 100 square inches per 24 hours. The films are also characterized by having a transverse tear strength of at least 170, and often at least 185, grams per mil of thickness.

Films extruded from solid, flexible, high copolymers prepared by the copolymerization of ethylene with propylene over a chromium oxide-phosphorus-silica-alumina catalyst according to this invention have, in addition to very low moisture-vapor permeability, good tensile strength and tear strength. They are superior in moisture-vapor permeability to films prepared from presently available commercial polyethylenes produced by other processes. They are particularly desirable for film packaging materials for meats, cheese, fresh vegetables, dried eggs, milk, etc., and for coating paper to be used as packaging material. Films ranging in thickness as small as 0.001 inch or less can be prepared from the copolymers of this invention.

Films prepared by blending commercial polyethylene with solid ethylene polymers prepared over a chromium oxide-phosphorus-silica-alumina catalyst have intermediate moisture-vapor permeability. Films prepared from ethylene-propylene copolymers, as herein described, have properties as good or better than those prepared from blends of the two types of ethylene polymers and, in addition, there are certain advantages in the process steps for the production of the copolymer films. Ethylene-propylene copolymers are readily prepared and used as such for extrusion into films without further processing.

The following specific example presents data which illustrates a present preferred embodiment of this invention. It should be evident that this example is presented as an illustration of the invention rather than a limitation thereof.

*Example I*

The catalyst in run No. 1 was prepared by impregnating a 90 silica-10 alumina (parts by weight) coprecipitated support with an aqueous solution of chromium trioxide to produce a catalyst containing 2.5 weight percent of chromium as the oxide. The catalyst of run No. 2 was prepared in a similar manner on another portion of the same support by impregnating the support with an aqueous solution of chromium trioxide and phosphoric acid to produce a catalyst containing 2.5 weight percent chromium and 2.5 weight percent phosphorus. This was accomplished by impregnating 50 cubic centimeters of a 50–100 mesh, 90 silica-10 alumina support with 100 cubic centimeters of an aqueous 0.76 molar solution of $CrO_3$ containing 9 cubic centimeters of an 83 weight percent aqueous solution of $H_3PO_4$. The support was allowed to remain in the solution for approximately five minutes. Each catalyst was dried and then activated in air at 950° F. for five hours.

The two catalysts were compared for the polymerization of ethylene in a stirred reactor. The catalyst and solvent were charged to the reactor. The temperature was raised to about reaction temperature. Ethylene was then added at a rate of about 67 grams an hour. The maximum pressure, limited by a pressure controller, was reached in about one hour. The runs were continued for a total time of four hours, at which time the runs were stopped. The data are presented in the table below.

| Run No | 1 | 2 |
|---|---|---|
| | Catalyst | |
| | Without phosphorus | With phosphorus |
| Catalyst, grams | 1.66 | 1.69 |
| Cyclohexane, lbs | 0.61 | 0.61 |
| Temperature, °F | 270 | 270 |
| Pressure (p.s.i.g., maximum) | 450 | 450 |
| Duration, hours | 4 | 4 |
| Yield, grams polymer g. polymer/g. cat | 134.8 / 81.2 | 150.2 / 88.9 |
| Reaction rate, g. polymer/g. cat./hr | 20.3 | 22.2 |

These data show that ethylene polymer was produced at an appreciably faster rate with the phosphorus containing catalyst than with a corresponding catalyst not containing phosphorus.

While the invention has been described in conjunction with present preferred embodiments, it obviously is not limited thereto.

What is claimed is:

1. In the polymerization of alphatic 1-olefins the improvement comprising carrying out said polymerization in the presence of a chromium oxide-phosphorus oxide supported catalyst, said catalyst containing a phosphorus to chromium atomic ratio in the range 0.1:1 to 4:1 and at least a portion of the chromium being in the hexavalent state.

2. A process for polymerizing an aliphatic 1-olefin having a maximum chain length of 8 carbon atoms with no branching nearer the double bond than the 4-position, said process comprising carrying out said polymerization in presence of a chromium oxide-phosphorus oxide catalyst associated with at least one member of the group consisting of silica, alumina, zirconia, and thoria as catalyst support wherein at least a portion of said chromium oxide is in the hexavalent state and the phosphorus to chromium atoms ratio is in the range 0.1:1 to 4:1.

3. The process of claim 2 wherein the support is silica-alumina wherein the silica is in the major proportion.

4. The process of claim 3 wherein said polymerization is carried out in liquid phase in the presence of a hydrocarbon diluent.

5. The process of claim 4 wherein said polymerization is carried out at a temperature in the range 150 to 450° F.

6. The process of claim 5 wherein the catalyst contains at least 0.1 percent of chromium in the hexavalent state.

7. The process of claim 5 wherein said 1-olefin is ethylene.

8. A process for polymerizing an aliphatic 1-olefin of 2 to 8 carbon atoms and having no branching nearer the double bond than the 4-position, said process comprising contacting such an olefin with a composite catalyst of chromium oxide including at least a portion of hexavalent chromium plus a phosphorus oxide deposited on a silica-alumina support, said catalyst having been prepared by impregnating a silica-alumina support with an aqueous solution of chromium compound convertible to the oxide when heated and an aqueous solution of phosphorus compound which leaves a residue of phosphorus oxide on heating, and calcining the impregnated support to convert the chromium compound to chromium oxide of which at least a portion of the chromium is in hexavalent form and obtain phophorus oxide from the phosphorus compound and wherein the resulting catalyst contains an atomic ratio of phosphorus to chromium in the ratio 0.1:1 to 4:1.

9. The process of claim 8 wherein the chromium compound is chromium trioxide and the phosphorus compound is phosphoric acid.

10. The process of claim 9 wherein the chromium oxide is present in the range 1 to 6 weight percent of the catalyst and the phosphorus oxide is present in the range 1 to 5 weight percent of the catalyst.

References Cited in the file of this patent

UNITED STATES PATENTS

| | | |
|---|---|---|
| 1,882,712 | Andrussow et al. | Oct. 18, 1932 |
| 1,975,476 | Pier et al. | Oct. 2, 1934 |
| 2,324,079 | Greger | July 13, 1943 |
| 2,387,784 | Thomas | Oct. 30, 1945 |
| 2,402,051 | Ipatieff et al. | June 11, 1946 |
| 2,462,938 | Bludworth et al. | Mar. 1, 1949 |
| 2,474,670 | Hersberger | June 28, 1949 |
| 2,496,621 | Deery | Feb. 7, 1950 |
| 2,503,991 | Bechtold | Apr. 11, 1950 |
| 2,608,534 | Fleck | Aug. 26, 1952 |
| 2,728,758 | Field et al. | Dec. 27, 1955 |
| 2,773,837 | Gutzeit et al. | Dec. 11, 1956 |
| 2,825,721 | Hogan et al. | Mar. 4, 1958 |